United States Patent

Dahl

[15] 3,648,551

[45] Mar. 14, 1972

[54] TOOL MOUNTING FOR SLIDE LATHES

[72] Inventor: Gustaf Adolf Dahl, Strandgatan 10, 302 46 Halmstad, Sweden

[22] Filed: Jan. 21, 1970

[21] Appl. No.: 4,696

[30] Foreign Application Priority Data

Jan. 28, 1969 Sweden..................1107/69

[52] U.S. Cl..................................................82/36
[51] Int. Cl...............................................B23b 29/04
[58] Field of Search...............................82/36, 37

[56] References Cited

UNITED STATES PATENTS 3,024,686   3/1962   Daugusta..................................82/36

FOREIGN PATENTS OR APPLICATIONS 426,534   10/1947   Italy..........................................82/37
1,128,256   4/1962   Germany..................................82/36

Primary Examiner—Leonidas Vlachos
Attorney—Ralph E. Bucknam, Jesse D. Reingold, Robert R. Strack and Henry A. Marzullo, Jr.

[57] ABSTRACT

A tool mounting comprises a circular cylindrical block to be clamped on a lathe slide, and a tool holder with a corresponding circular cylindrical engagement surface to be clamped to the block by means of a radially oriented tension bolt therein, and with the lathe tool at an angle of 45° to the tension bolt.

2 Claims, 3 Drawing Figures

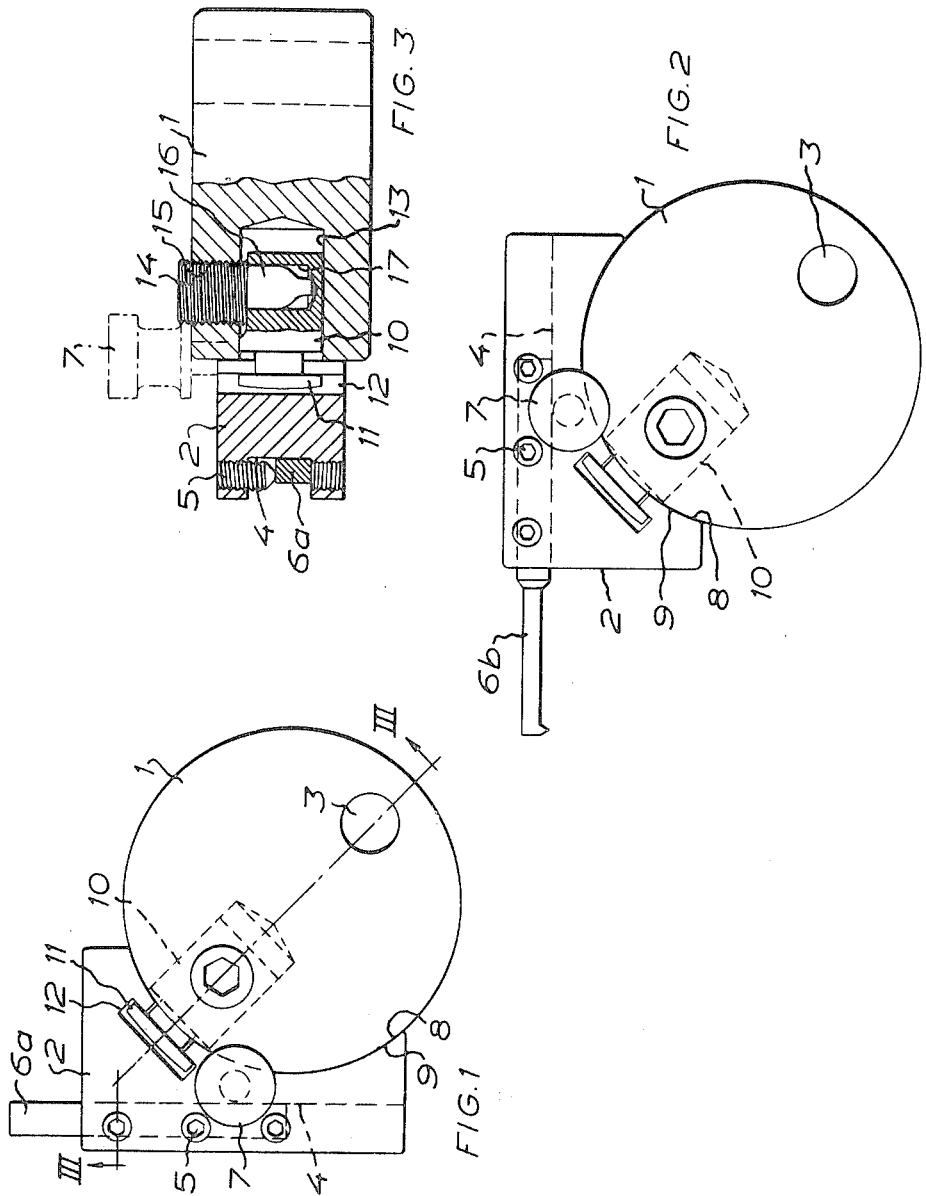

TOOL MOUNTING FOR SLIDE LATHES

This invention relates to slide lathes and more particularly to such small-size lathes for precision mechanics as require but relatively small cutting forces.

More specifically, the invention relates to a tool mounting for such lathes which comprises a block to be clamped on the slide of the lathe, and at least one tool holder to be clamped to the side of the block by means of a tension bolt which can be tightened therein and engages in an undercut groove in the tool holder.

The primary object of the invention is to reduce the cost of such tool mountings. To this end, the tool mounting according to the invention is characterized in that the block is circular cylindrical and has the tension bolt radially oriented to clamp the tool holder against the circumferential surface of the block in two alternative positions with a tool clamped to said holder at an angle of 45° to the tension bolt.

By reason of the circular shape one and the same tool holder, if it is reversible, or two alternative tool holders can be clamped to the block with the aid of one and the same tension bolt for respectively external and internal turning. In other words, the block requires but a single tension bolt which, like the simple cylindrical shape, considerably simplifies the manufacture of the block compared to the conventional square blocks having two tension bolts, one for side-tool holders and one for boring-tool holders.

A practical embodiment of the invention is illustrated in the accompanying drawing in which:

FIGS. 1 and 2 are top plan views of one and the same block with a tool holder clamped for respectively external and internal turning;

FIG. 3 is a vertical section on line III—III in FIG. 1.

1 designates the block of the tool mounting, which block is in the shape of an upright circular cylinder having planar upper and lower sides, and 2 designates an associated tool holder. In conventional manner, the block 1 has a vertical through hole 3 to permit clamping the block to a lathe slide. In conventional manner, the tool holder has a groove 4 and tightening screws 5 for clamping a lathe tool 6a or 6b, and the holder is also equipped with a vertical adjustment screw 7 by means of which the vertical adjustment of the holder on the block can be set and also preserved if the holder is to be removed from the block and later mounted again in the same position. The threaded holes for the screws 5 and 7 are through holes, and as a consequence the tool holder can be used with any side whatever turned upwardly.

The tool holder, of course, has a circular cylindrical concave surface 8 with which to engage the circumferential surface 9 of the block. Clamping of the tool holder to the block takes place by conventional means, viz a horizontal tension bolt 10 having a head 11 which engages in an undercut groove 12 in the holder and is guided in a bore 13 in the block 1 to be drawn in by means of a vertical pin 14 which is rotatable in a bore 15 of the block 1 and at its lower part has an eccentric 16 which is accommodated in a hole 17 of the tension bolt 10. In the embodiment shown, the pin 14 and the bore 15 are threaded, the intention being that the pin shall be supported not only radially but also axially in the block 1.

As will appear from FIG. 3, the threaded holes formed in the holder 2 for the screws 5 and 7 are through holes, and the groove 12 for the head 11 of the tension bolt 10 extends throughout the holder 2. As a result, the holder is reversible and can thus be placed on the block 1 in two positions, as will appear from FIGS. 1 and 2, viz one for operation with an external lathe tool 6a and one (reversed position) for operation with an internal lathe tool 6b. In both cases the holder 2 is clamped with the aid of the same tension bolt 10 which, by suitable orientation of the block 1 on the lathe slide, is at an angle of 45° to the lathe spindle, while the holder 2 is so designed that its seat for the tool at the tooling will be at an angle of 45° to the tension bolt and thus either at right angles to, or parallel with, the lathe spindle.

In order that the tool mounting described shall have a maximum of stability it is recommended to form the concave engagement surface 8 of the tool holder 2 with a slightly smaller radius than that of the corresponding circumferential surface 9 of the block 1. When the holder is then clamped to the block it is subjected to a small elastic deformation to provide full engagement thereof, with the engagement pressure concentrated towards the ends of the surface 8. This tool mounting of course cannot withstand an equally high load as a conventional mounting having a square block and approximately equivalent total dimensions, but it is useful to a large extent for precision mechanical work in bench lathes with moderate power resources.

What I claim and desire to secure by Letters Patent is:

1. A tool mounting for slide lathes, particularly bench lathes, comprising a block which is to be clamped on the slide of the lathe, and at least one tool holder which is to be clamped to the side of the block by means of a tension bolt which can be tightened therein and engages in an undercut groove in the tool holder, wherein the block is circular-cylindrical, the surface of the tool holder is concave for engagement with the surface of the block and the tension bolt is radially oriented to clamp the tool holder against the circular-cylindrical circumferential surface of the block in two alternative positions with a tool clamped to said holder at an angle of 45° to the tension bolt.

2. A tool mounting as claimed in claim 1, wherein a circular-cylindrical engagement surface of the tool holder has a slightly smaller radius than the circular-cylindrical circumferential surface of the block in order to be clamped to said surface with the pressure concentrated to the distal parts of the engagement surface.

* * * * *